July 16, 1957  C. VANDERLINDE ET AL  2,799,091
ADJUSTABLE BORE GAUGE
Filed Jan. 4, 1955
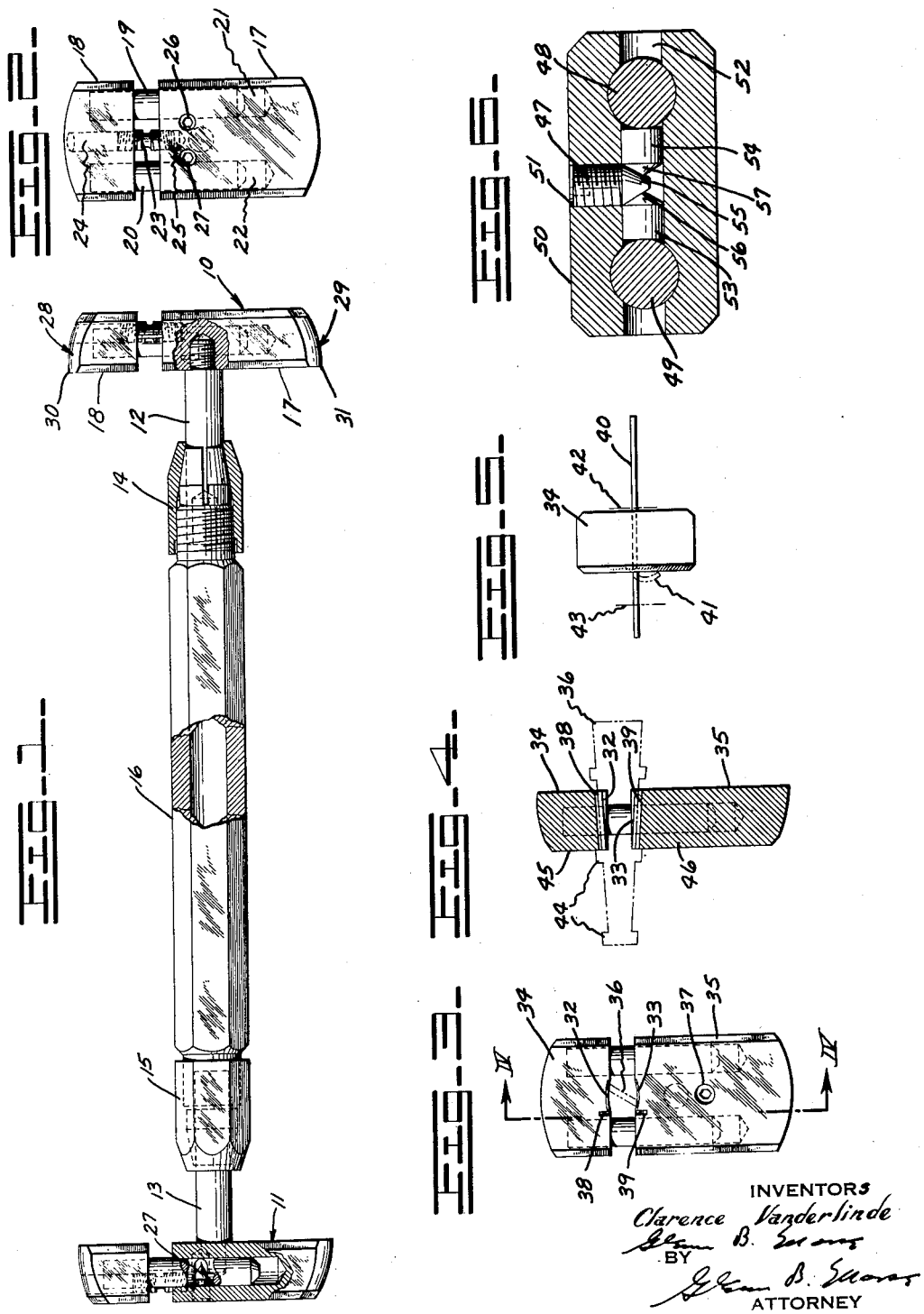
INVENTORS
Clarence Vanderlinde
Glenn B. Sears
BY
Glenn B. Sears
ATTORNEY

United States Patent Office 2,799,091
Patented July 16, 1957

2,799,091

ADJUSTABLE BORE GAUGE

Clarence Vanderlinde, North Muskegon, and Glenn B. Morse, Grand Rapids, Mich.

Application January 4, 1955, Serial No. 479,798

4 Claims. (Cl. 33—178)

This invention relates to the construction of adjustable bore gauges. The inspection of bores in products which are in quantity production involves the insertion of a gauging member within the bore to determine whether or not the bore is below, equal to, or in excess of the measurement of the gauging member. It is also conventional to provide two gauging members for inspection of a particular bore, each of the gauging members being adjusted to a particular measurement corresponding to the upper or lower allowable tolerance.

The manufacture of the gauging members out of solid blocks is subject to the obvious objection that the cost of providing a set of gauges for an extended production program is a very substantial item. Further, such fixed gauges are single-purpose tools, and are ordinarily discarded after the production of that particular bore has been discontinued. These factors have resulted in the development of adjustable gauges which may be set as required, and more or less securely locked in position. Such gauges are not only easier to adapt to the needs in the first instance, but are continuously re-usable. The gauge covered by this invention is of this type.

The preferred form of this invention centers in a set of two blocks, one of these having a pair of parallel guide rods securely fixed thereto. The other of the two blocks contains parallel bores disposed to receive the guide rods in sliding relationship. The opposite ends of the blocks (which are most remote from each other) are formed to the desired curvature for the performance of the gauging operation. It is usually preferred to form these surfaces on a spherical curvature, utilizing a radius of curvature which is less than the radius of the smallest bore to which the device may be adjusted to enter. The use of spherical curvature on the gauging ends of the blocks is not necessary, however, and almost any type of curvature having a local radius at the point of engagement which is less than the radius described above will suffice.

The relative movement of the two gauge blocks to establish the desired gauging measurement is preferably induced through the use of an adjusting screw which enters both blocks with threads of opposite hand, respectively. Rotation of the screw therefore induces movement of the blocks either toward or away from each other, depending upon the direction of rotation. The adjusted position of the blocks is made secure in one modification of this invention through the provision of threaded holes which intersect the bores receiving the guide rods at a position corresponding to the side of the rods. These threaded holes receive set screws having preferably conical points which bear tangentially against the sides of the guide rods in the manner of a wedge to lock the gauge in the adjusted position. In this modification of the invention, the set screws are disposed so that they generate an axial frictional force during the tightening process which is in opposite directions. Tightening of one of them therefore tends to move the blocks more closely together, and tightening the opposite one has the opposite effect. This arrangement tends to minimize the disturbance of the blocks after the adjusted position of the same has been determined through the use of micrometers or some arrangement of gauging abutments.

A further modification of this invention involves the use of a transverse hole which intersects both the threaded hole referred to above and the bore which receives the guide rods. A similar set screw with a tapered end is used, and a plug is provided in the additional bore, the plug having a tapered end formed to engage the tapered end of the set screw. The plug is interposed between the set screw and the guide rode. Tightening the screw therefore tends to drive the plug against the guide rod. A desirable feature of this form of the invention is simply the fact that one set screw can be used which tends to drive itself between two plugs and establish forces in a direction directly perpendicular to the axis of the guide rods. The tightening of the screw therefore has no tendency to induce movement of the guide blocks. The time required for adjusting this form of the invention is also reduced because of the neecssity of adjusting only one screw in place of the pair of screws in the previously described modification.

The invention also provides for the adjustment of the position of the guide blocks through the use of a tapered key member. This member may be placed into a suitable opening between the blocks, and rotated in the fashion of a screw driver to induce opening movement. Having arrived at the proper position, this adjustment may be made secure through either one of the locking modifications described above. It is further possible to utilize a key of this type to establish a semi-permanent solid member between the two gauge blocks so that accidental application of forces between the ends of the blocks will not tend to jar them together, and thereby ruin the adjustment of the gauge.

Several features of this invention will be discussed in detail through analysis of the particular embodiments illustrated in the accompanying drawing. In the drawing, Figure 1 presents a side elevation, partially in section, showing the preferred form of this invention, with the gauging unit at the opposite ends of a handle.

Figure 2 presents an end elevation of the gauge unit shown in Figure 1.

Figure 3 illustrates a modified form of the invention in end elevation.

Figure 4 presents a sectional side elevation of the device illustrated in Figure 3, taken on the plane 4—4.

Figure 5 illustrates the use of a semi-permanent key member used to supplement the locking action of a gauge unit.

Figure 6 is a section on an enlarged scale showing a modified form of the locking system provided by this invention.

Referring to Figure 1, gauge units indicated generally at 10 and 11 are each mounted on short sections of rod 12 and 13, respectively, which are received within the collet portions 14 and 15 of the handle 16. Ordinarily, the opposite gauge units 10 and 11 will be set to the "go" and "no-go" tolerance limits of a particular bore with which the gauge is to be used. Each of the gauging units 10 and 11 is similarly constructed, and only one of these will therefore be described in detail. The gauge 10 includes the blocks 17 and 18, with the guide rods 19 and 20 being fixed with respect to the block 18. The block 17 is provided with the bores 21 and 22 which slidably receive the guide rods 19 and 20, respectively. The set screw 23 is oppositely threaded at its ends, and engages the similarly threaded holes 24 and 25 in the blocks 17 and 18 to induce sliding movement of the blocks in the direction determined by the guide rods 19 and 20.

In the modification illustrated in Figures 1 and 2, the locking screws 26 and 27 are positioned so that the conical ends of the screws (best shown at the left end of Figure 1) are brought to bear against the side of the guide rods as the screws are tightened. The screws 26 and 27 are of similar thread, and it will be appreciated that the right hand rotation of the screw 26 will tend to create a downward force as shown in Figure 2 tending to move the block 18 toward the block 17. The opposite effect will take place on the similar rotation of the screw 27 on tightening.

After the blocks 17 and 18 have been moved to their adjusted position by the screw 23, and locked there through tightening of the screws 26 and 27, the gauging surfaces 28 and 29 are expected to conform to the desired gauging dimension at the point of greatest distance between these surfaces, which is ordinarily at the points indicated at 30 and 31. The use of a gauge of this type ordinarily consists of the insertion of one of the ends into the bore to be tested, with the axis of the handle 16 somewhat askew to the axis of the bore. The gauge may be then gently rocked to determine whether the bore is smaller, equal to, or larger than the dimension established by the gauge.

Referring to Figure 3, a modified form of the invention is illustrated in which the double-threaded screw adjusting system is replaced by the provision of a cutaway indicated at 32 and 33 in the blocks 34 and 35. This cutaway area is preferably tapering in depth as shown in Figure 4, and somewhat arcuate in cross section as shown in Figure 3. The insertion of a key as shown in dotted lines at 36 may then be followed by the rotation of the key as a screwdriver to induce the separation of the blocks 34 and 35. On arriving at the desired gauging dimension, a locking screw 37 may be tightened to maintain this condition.

If desired, a solid locking member may be interposed between the blocks 34 and 35 to provide a bridge between these members to supplement the action of the locking screw 37. Such a key is preferably formed of soft material, and is inserted in the opposite slots 38 and 39 in the blocks 34 and 35, respectively, and is moved into position in the manner of a wedge. This type of wedge, incidentally, can also be used for inducing separation of the blocks merely through the shoving home of the wedge until the desired position is obtained. In any event, the final position of the wedging strip (indicated at 40 in Figure 5) may be maintained through bending over a portion of the small end of the wedge as indicated at 41 to prevent retraction of the wedge after the adjustment has been made. The soft wedging strip 40 may then be cut off approximately as indicated at 42 and 43.

When the key is used for adjustment alone, it is preferable that the key be formed with the lateral projections 44 as shown in dotted lines in Figure 4. With this configuration, the key may be inserted in a plane substantially perpendicular to the axis of the guide rods, in such a manner that the rotation of the key for adjusting purposes causes one pair of the projections to move behind the surfaces 45 and 46, respectively, of the gauge blocks to prevent withdrawal of the key to the right during the rotation of the key as a result of the taper. Having achieved the adjusted position desired, the key is again rotated into a position perpendicular to the axes of the guide rods, and then withdrawn.

Referring to Figure 6, a modified form of the invention is illustrated which relates to the use of a single locking screw 47. The guide rods 48 and 49 are received within appropriate bores in the block 50, which is also provided with a threaded transverse hole 51 to receive the set screw 47. A further hole 52 is disposed transversely both to the guide rods 48 and 49 and to the threaded hole 51. The plugs 53 and 54 are disposed within the hole 52, and are interposed between the set screw 47 and guide rods 48 and 49, respectively. The screw 47 has a tapered inner end 55, and the plugs 53 and 54 have correspondingly tapered ends 56 and 57 for engagement with the inner end of the screw 47. Tightening of the screw 47 drives the plugs 53 and 54 in opposite directions, perpendicularly with respect to the axes of the rods 48 and 49, and binds them securely in the adjusted position.

The particular embodiments of the present invention which have been illustrated and discussed herein are for illustrative purposes only, and are not to be considered as a limitation upon the scope of the appended claims. In these claims, it is our intent to claim the entire invention disclosed herein, except as we are limited by the prior art.

We claim:

1. An adjustable bore gauge comprising: a first block, said first block having parallel guide rod means fixed with respect thereto; a second block, said second block having parallel bores disposed to slidably receive said guide rod means, and also having transverse threaded holes each intersecting the sides of said bores respectively; a locking screw engaged in each of said threaded holes and having a tapered inner end, said screws normally engaging said guide rod means on the sides of said tapered inner ends, respectively; and adjusting screw means having oppositely threaded portions at the opposite ends thereof, respectively, and engaging one of said blocks with each of said threaded portions, respectively; and handle means secured to one of said blocks.

2. An adjustable bore gauge comprising: a first block, said first block having parallel guide rod means fixed with respect thereto; a second block, said second block having parallel bores disposed to slidably receive said guide rod means, and also having transverse threaded holes each intersecting the sides of said bores respectively; a locking screw engaged in each of said threaded holes and having a tapered inner end, said screws normally engaging said guide rod means on the sides of said tapered inner ends, respectively; and handle means secured to one of said blocks.

3. An adjustable bore gauge comprising: a first block, said first block having parallel guide rod means fixed with respect thereto; a second block, said second block having parallel bores disposed to slidably receive said guide rod means, said guide rod means having the opposite ends thereof respectively normally entirely retained within said first and second blocks, said second block also having a transverse threaded hole intersecting the side of at least one of said bores; and a locking screw engaged in said threaded hole and having a tapered inner end, said screw normally engaging said guide rod means on the side of said tapered inner end.

4. An adjustable bore gauge comprising: a first block, said first block having guide means fixed with respect thereto; a second block, said second block having guide-receiving means disposed to slidably receive said guide means, said guide means having the opposite ends thereof respectively normally entirely retained within said first and second blocks, said second block also having a transverse threaded hole intersecting the sides of said guide receiving means; and a locking screw engaged in said threaded hole and having a tapered inner end, said screw normally engaging said guide means on the side of said tapered inner end.

References Cited in the file of this patent

UNITED STATES PATENTS

| | | |
|---|---|---|
| 142,823 | Toulmin | Sept. 16, 1873 |
| 1,280,138 | Blair | Oct. 1, 1918 |
| 1,311,349 | Hoagland | July 29, 1919 |
| 1,525,491 | Bath | Feb. 10, 1925 |
| 1,952,190 | Wells | Mar. 27, 1934 |
| 2,568,301 | Ball et al. | Mar. 28, 1945 |